United States Patent
Liao et al.

(10) Patent No.: US 10,038,750 B2
(45) Date of Patent: Jul. 31, 2018

(54) METHOD AND SYSTEM OF SHARING DATA AND SERVER APPARATUS THEREOF

(71) Applicant: Wistron Corporation, New Taipei (TW)

(72) Inventors: Fang-Wen Liao, New Taipei (TW); Ping-Hung Chen, New Taipei (TW); Pen-Tai Miao, New Taipei (TW)

(73) Assignee: Wistron Corporation, New Taipei (TW)

( * ) Notice: Subject to any disclaimer, the term of this patent is extended or adjusted under 35 U.S.C. 154(b) by 286 days.

(21) Appl. No.: 14/676,763

(22) Filed: Apr. 1, 2015

(65) Prior Publication Data

US 2016/0182634 A1 Jun. 23, 2016

(30) Foreign Application Priority Data

Dec. 17, 2014 (TW) .............................. 103144111 A

(51) Int. Cl.
*G06F 15/16* (2006.01)
*H04L 29/08* (2006.01)

(52) U.S. Cl.
CPC .......... *H04L 67/1097* (2013.01); *H04L 67/36* (2013.01)

(58) Field of Classification Search
CPC ......... G06F 3/1454; G06F 3/023; G06F 9/543
See application file for complete search history.

(56) References Cited

U.S. PATENT DOCUMENTS

| 5,996,002 | A | * | 11/1999 | Katsurabayashi | .... G06F 3/1454 709/204 |
| 8,639,812 | B2 | | 1/2014 | Leibow | |
| 8,953,676 | B2 | * | 2/2015 | Matsui | ................. G06F 3/1431 375/240.1 |
| 2005/0093868 | A1 | * | 5/2005 | Hinckley | ................ G06F 3/011 345/502 |

(Continued)

FOREIGN PATENT DOCUMENTS

| CN | 101896900 | 11/2010 |
| TW | I443581 | 7/2014 |

OTHER PUBLICATIONS

"Office Action of China Counterpart Application," dated Apr. 3, 2018, p. 1-p. 8.

*Primary Examiner* — Shean Tokuta
(74) *Attorney, Agent, or Firm* — JCIPRNET

(57) ABSTRACT

A method and system of sharing data and a server apparatus thereof are provided. The method includes following steps. When a first operation command is detected, first operation information is transmitted from a server apparatus to a first client apparatus. The first operation information is received by the first client apparatus to execute a first operation, and data information related to a data object is generated and transmitted to the server apparatus. The data information is received and transmitted to other client apparatuses by the server apparatus, so as to enable a second operation related to the data object. When a second operation command is detected, second operation information is transmitted to a second client apparatus by the server apparatus. In response to the second operation information, the second client apparatus is connected to the first client apparatus to obtain the data object according to the data information.

11 Claims, 5 Drawing Sheets

(56) References Cited

U.S. PATENT DOCUMENTS

| | | | | |
|---|---|---|---|---|
| 2005/0235121 A1* | 10/2005 | Ito | | G06F 11/2074 711/162 |
| 2006/0184614 A1* | 8/2006 | Baratto | | G06F 3/14 709/203 |
| 2007/0174423 A1* | 7/2007 | Yoshida | | H04L 67/2814 709/217 |
| 2008/0048975 A1* | 2/2008 | Leibow | | G06F 3/023 345/156 |
| 2008/0225335 A1* | 9/2008 | Shozaki | | H04L 12/185 358/1.15 |
| 2009/0125586 A1* | 5/2009 | Sato | | G06F 3/1454 709/203 |
| 2009/0319909 A1* | 12/2009 | Hsueh | | G06F 9/543 715/740 |
| 2011/0239125 A1* | 9/2011 | Kristensen | | G06F 21/31 715/743 |
| 2012/0019858 A1* | 1/2012 | Sato | | H04N 1/00344 358/1.15 |
| 2012/0110470 A1 | 5/2012 | Mistry et al. | | |
| 2012/0110576 A1 | 5/2012 | Lin et al. | | |
| 2012/0311119 A1 | 12/2012 | Chen et al. | | |
| 2013/0156269 A1* | 6/2013 | Matsui | | H04N 1/00209 382/107 |
| 2013/0238744 A1* | 9/2013 | Paschke | | G06F 9/543 709/216 |
| 2013/0282774 A1* | 10/2013 | Attarde | | G06F 3/0613 707/823 |
| 2014/0032771 A1* | 1/2014 | Pegg | | H04L 67/1091 709/228 |
| 2014/0040964 A1* | 2/2014 | Hinners | | H04N 21/42653 725/87 |
| 2014/0064119 A1* | 3/2014 | Iizuka | | H04L 43/0829 370/252 |
| 2014/0078020 A1* | 3/2014 | Yamada | | G06F 3/147 345/1.1 |
| 2014/0111528 A1* | 4/2014 | Lifshitz | | G06T 1/20 345/522 |
| 2014/0125575 A1* | 5/2014 | Samanta Singhar | | G06F 3/005 345/156 |
| 2014/0164632 A1* | 6/2014 | Kim | | H04L 67/34 709/227 |
| 2014/0215358 A1* | 7/2014 | Uratani | | G06F 3/048 715/753 |
| 2014/0258441 A1* | 9/2014 | L'Heureux | | H04W 12/06 709/217 |
| 2014/0280132 A1* | 9/2014 | Auger | | G06F 9/543 707/736 |
| 2014/0304839 A1* | 10/2014 | Hansen | | G06F 21/6209 726/29 |
| 2014/0349748 A1* | 11/2014 | Haberman | | A63F 13/355 463/31 |
| 2015/0006396 A1* | 1/2015 | Akashika | | G06Q 20/322 705/44 |
| 2015/0019694 A1* | 1/2015 | Feng | | H04L 65/601 709/219 |
| 2015/0081443 A1* | 3/2015 | Davis | | G06Q 30/0251 705/14.58 |
| 2015/0082157 A1* | 3/2015 | Zhang | | G06F 17/24 715/255 |
| 2015/0143534 A1* | 5/2015 | Bowles | | G06Q 50/184 726/26 |
| 2015/0215570 A1* | 7/2015 | Leibow | | G06F 3/1454 386/231 |
| 2015/0237199 A1* | 8/2015 | Hameenniemi | | H04M 3/2236 455/422.1 |
| 2015/0255046 A1* | 9/2015 | Kubota | | G09G 5/38 345/522 |
| 2015/0326575 A1* | 11/2015 | Ramirez Flores | | G06F 21/00 726/5 |

* cited by examiner

METHOD AND SYSTEM OF SHARING DATA AND SERVER APPARATUS THEREOF

CROSS-REFERENCE TO RELATED APPLICATION

This application claims the priority benefit of Taiwan application serial no. 103144111, filed on Dec. 17, 2014. The entirety of the above-mentioned patent application is hereby incorporated by reference herein and made a part of this specification.

BACKGROUND OF THE INVENTION

1. Field of the Invention

The present invention generally relates to a data sharing method and a data sharing system, in particular, to a data sharing method and a data sharing system between a server apparatus and a plurality of client apparatuses.

2. Description of Related Art

Through the development in network technology and electronic products, a screen sharing technique, such as WiFi display, AirPlay, Wireless Display (WiDi) and Miracast, is increasingly applied in various electronic devices with audio and video features. Specifically, the user may integrate screen displays of multiple electronic devices into a screen of any one of the aforesaid electronic devices through the screen sharing technique.

A multi-screen sharing system applying the screen sharing technique may collect screen displays of multiple electronic apparatuses and share the collected screen displays on a main screen. Besides the screen sharing feature, the multi-screen sharing system may further control and manage the electronic apparatuses in the system. For example, U.S. Application Publication Number 2012031119 discloses a method and a system for remote management. A plurality of user apparatuses are connected to a host to execute a specific application, and an administrator apparatus is connected to the host to manage the user apparatuses connected to the host. Through the above disclosed technique, the multi-screen sharing system with screen sharing and remote controlling features may be applicable to an interactive teaching program or an interactive meeting.

Nevertheless, except the electronic apparatus serving as the host or the server, the other electronic apparatuses in the conventional multi-screen sharing system are not allowed to share data with each other directly. In other words, a non-host or non-server electronic apparatus may only share data with an aid of a third-party intermediary, such as a flash disk or a host, and it is rather time-consuming and inconvenient in usage.

SUMMARY OF THE INVENTION

Accordingly, the present invention is directed to a data sharing method and a data sharing system, where non-host or non-server electronic apparatuses are allowed to transmit the data object to each other without a third party intermediary, and the inconvenience in usage would be thus reduced.

According to an exemplary embodiment of the invention, a data sharing method adapted to a data sharing system is provided. The data sharing system includes a server apparatus and a plurality of client apparatuses connected to the server apparatus. The server apparatus includes an interactive display, and screen display data of the client apparatuses is respectively shared in a plurality of displaying regions of the interactive display. The data sharing method includes the following steps. When a first operation command executed on a data object displayed in a first displaying region is detected, first operation information is transmitted to a first client apparatus by the server apparatus. The first operation information is received to execute a first operation, and data information related to the data object is generated by the first client apparatus. The data information is transmitted to the server apparatus by the first client apparatus. The data information is received by the server apparatus and transmitted to other client apparatuses. The data information is received by a second client apparatus so as to enable a second operation related to the data object. The second operation information is transmitted to the second client apparatus by the server apparatus when detecting that a second operation command associated with a second operation to be performed is executed on a second displaying region. The second operation information is received by the second client apparatus. In response to the second operation information, a communication connection with the first client apparatus is established by the second client apparatus to obtain the data object according to the data information.

According to an exemplary embodiment of the invention, a data sharing system including a server apparatus and a plurality of client apparatuses are provided. The server apparatus includes an interactive display. The client apparatuses are respectively connected to the server apparatus and respectively share screen display data in a plurality of displaying regions of the interactive display of the server apparatus. The server apparatus transmits first operation information to a first client apparatus when detecting that a first operation command is executed on a data object displayed in a first displaying region. The first client apparatus receives the first operation information to execute a first operation corresponding to the first operation command, generates data information related to the data object, and transmits the data information to the server apparatus. The server apparatus receives the data information and transmits the data information to other client apparatuses. The second client apparatus receives the data information so as to enable a second operation related to the data object. The server apparatus transmits the second operation information to the second client apparatus when detecting that a second operation command associated with a second operation to be performed is executed on a second displaying region. The second client apparatus receives the second operation information and establishes a communication connection with the first client apparatus according to the data information in response to the second operation information so as to obtain the data object.

In summary, in the proposed data sharing method and the data sharing system, in response to a first operation command executed on a data object of a first client apparatus by the user, data information related to the data object is obtained and transmitted to other client apparatuses so as to enable a second operation related to the data object in other client apparatuses. Next, in response that a second operation command associated with a second operation to be performed is executed on a second client apparatus by the user, the second client apparatus establishes a communication connection with the first client apparatus and obtains the data object. In such approach, the client apparatuses are allowed to transmit the data object to each other without a third party intermediary. Hence, the time for data transmission would be reduced, and the convenience in usage would be enhanced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
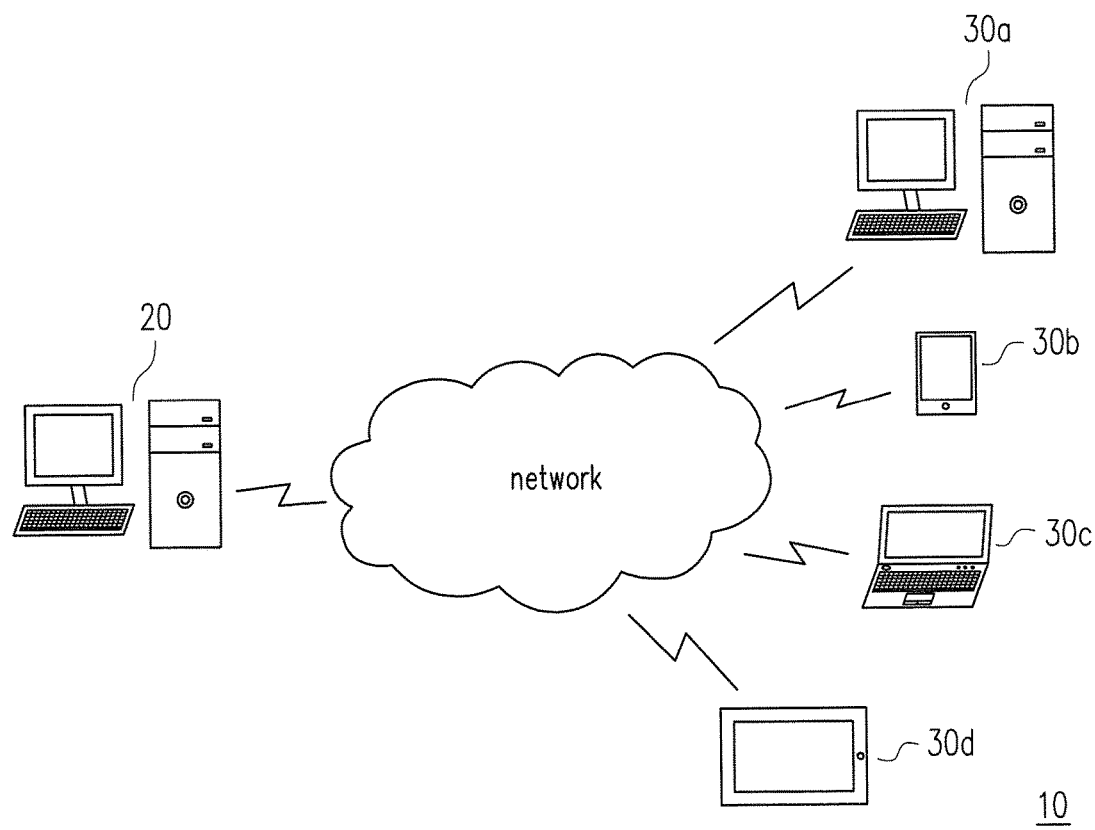
FIG. 1 illustrates a schematic diagram of a data sharing system according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram of a data sharing system according to an embodiment of the invention. Referring to FIG. 1, in the present embodiment, a data sharing system 10 is formed by a plurality of electronic apparatuses and may be, for example, a multi-screen sharing system or an interactive electronic whiteboard system, where one of the electronic apparatuses may be selected as a server apparatus 20, and the other electronic apparatuses may serve as client apparatuses 30a-30d. Each of the server apparatus 20 and the client apparatuses 30a-30d may be an electronic device such as a desktop computer, a laptop computer, a tabular computer, a mobile phone, and yet the invention is not limited thereto. To be more specific, the electronic device selected as the server apparatus 20 may, for example, execute a server application in the data sharing system 10, and the electronic devices serving as the client apparatuses 30a-30d may, for example, execute a client application in the data sharing system 10.

Figure 2:
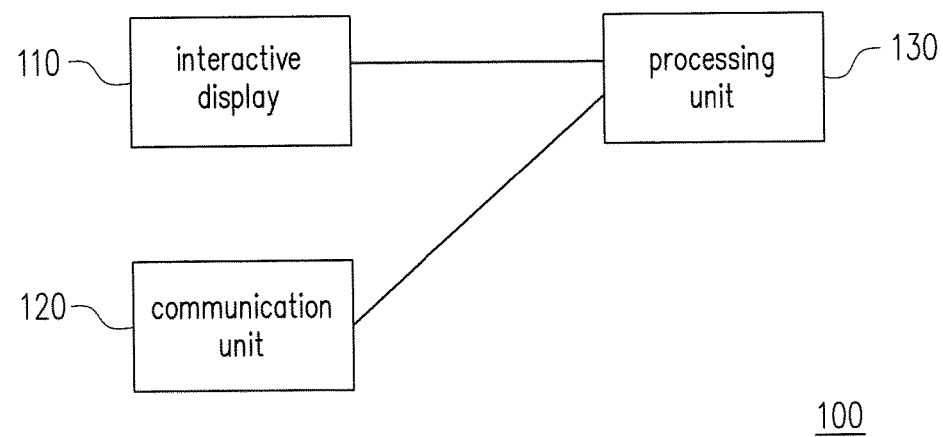
FIG. 2 illustrates a block diagram of an electronic apparatus according to an embodiment of the invention.

FIG. 2 is a block diagram of an electronic apparatus according to an embodiment of the invention. Referring to FIG. 2, each electronic apparatus 100 in the data sharing system 10, either the server apparatus 20 or the client apparatuses 30a-30d, at least includes an interactive display 110, a communication unit 120, and a processing unit 130. The interactive display 110 may be a touch display providing both touch and display features, and yet the invention is not limited thereto. To be more specific, the touch display may be composed by a display panel such as a liquid crystal display (LCD) or a light-emitting diode (LED) display as well as a resistive, capacitive, or an optical touch panel. In the present embodiment, the electronic apparatus 100 selected as the server apparatus 20 may display a character user interface or a graphic user interface to provide the user of the server apparatus 100 to control the data sharing system 10 and manage all the client apparatuses 30a-30d joining the data sharing system 10. On the other hand, the electronic apparatuses 100 serving as the client apparatus 30a-30d may display a user interface through the interactive display 110 to allow the client apparatuses 30a-30d to conveniently execute each function.

In other embodiments, the interactive display 110 of each of the electronic apparatuses 100 may be an ordinary display, and the user may operate the electronic apparatuses 100 or execute each function provided thereby through other input devices such as a keyboard or a mouse.

The communication unit 120 may be a wireless communication module supporting various wireless communication standards such as Bluetooth, WiFi, WiMax, NFC, LTE, and so forth. In other embodiments, the communication unit 120 further includes a wired communication module supporting ADSL or cable modem connection. In general, the electronic apparatuses 100 serving as the client apparatuses 30a-30d are respectively connected to the electronic apparatus 100 serving as the server apparatus 20 and thereby form the communication architecture of the data sharing system 10.

The processing unit 130 is coupled to the interactive display 110 and the communication unit 120. The processing unit 130 may be a central processing unit (CPU), a digital signal processor (DSP), a programmable controller, other similar components or a combination of the aforesaid components. The processing unit 130 is configured to execute programs or software to provide different functions.

In the present embodiment, the server apparatus 20 in the data sharing system 10 may be viewed as a sink apparatus, which may establish connection with each of the client apparatuses 30a-30d through a network and collect screen display data of the client apparatuses 30a-30d. The server apparatus 20 may further display the screen display data on a specific screen or feedback the screen display data to the client apparatuses 30a-30d so that the users of the client apparatuses 30a-30d or other members are able to share the screen display data. For example, the interactive display 110 of the server apparatus 20 may be divided into four displaying regions for displaying the screen display data from the client apparatuses 30a-30d respectively.

Figure 3:
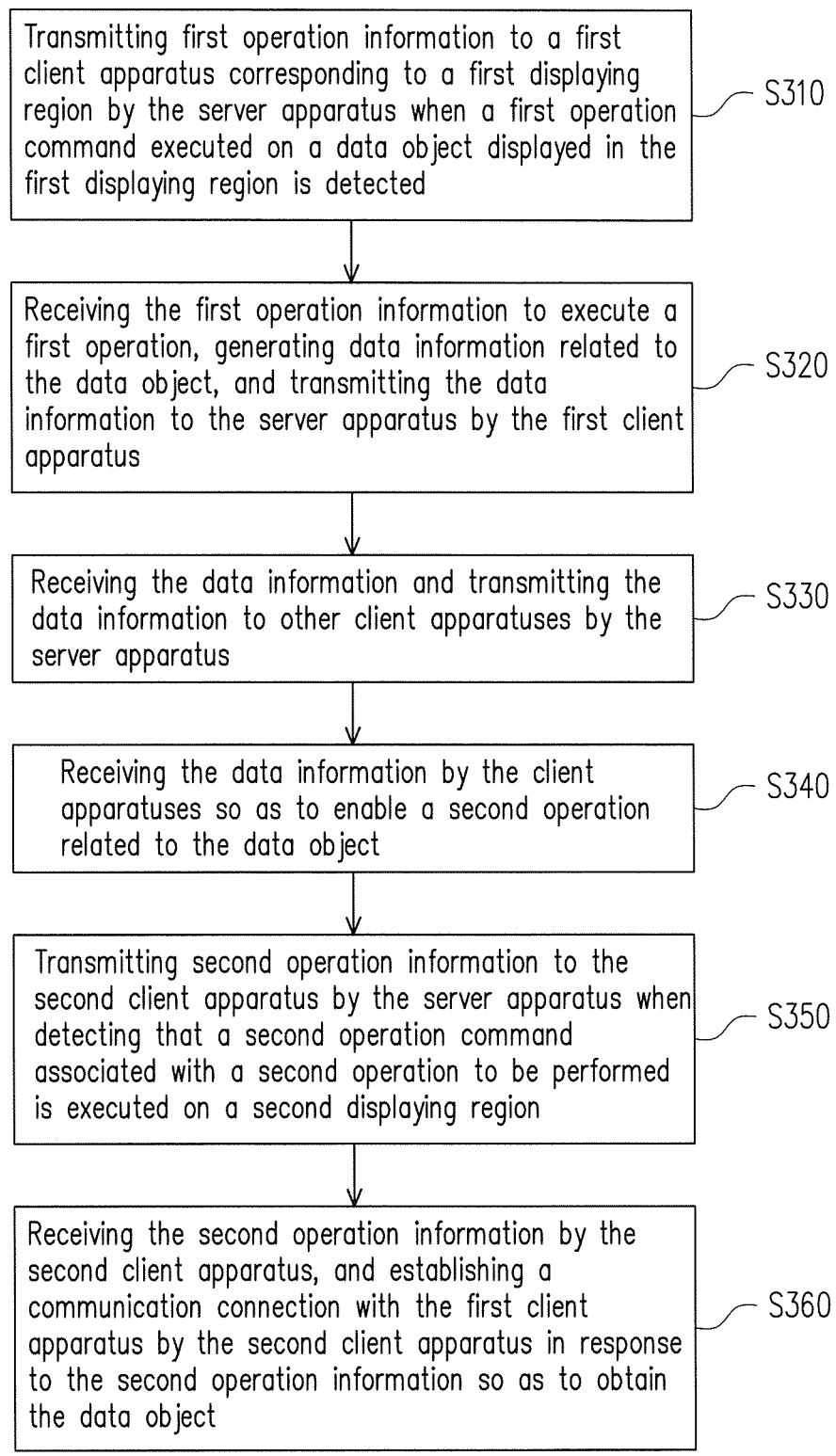
FIG. 3 illustrates a flowchart of a data sharing method according to an embodiment of the invention.

FIG. 3 illustrates a flowchart of a data sharing method according to an embodiment of the invention. The data sharing method is adapted to the data sharing system 10 and the electronic apparatus 100 shown in FIGS. 1 and 2. Referring to FIG. 3, when the server apparatus 20 detects that a first operation command is executed on data object displayed in a first displaying region of the interactive display 110 by the user, the server apparatus 20 transmits first operation information to a first client apparatus (e.g., a client apparatus 30a) corresponding to the first displaying region through the communication unit 120 (Step S310). Next, the client apparatus 30a receives the first operation information in response to the first operation command, and the processing unit 130 executes a first operation and generates data information related to the data object. The client apparatus 30a transmits the data information to the server apparatus 20 through the communication unit 120 (Step S320). After the server apparatus 20 receives the data information through the communication unit 120, it further transmits the data information to the other client apparatuses 30b-30d (Step S330). Next, the apparatuses 30b-30d receive data information through the communication units 120 so as to allow the processing unit 130 to enable a second operation related to the data object. (Step S340). After each of the other client apparatuses 30b-30d enables the second operation, when the server apparatus 20 detects that a second operation command associated with the second operation to be performed by the user is executed on a second displaying region of the interactive display 110, the server apparatus 20 transmits second operation information to a second client apparatus (e.g., a client apparatus 30*b*) corresponding to the second displaying region through the communication unit 120 (Step S350). The client apparatus 30*b* then receives the second operation information through the communication unit 120, and in response to the second operation information, the processing unit 130 of the client apparatus 30*b* establishes a communication connection with the client apparatus 30*a* according to the data information to obtain the aforesaid data object (Step S360).

To be specific, the first operation and the second operation correspond to a complete data transferring operation or data transmitting operation. For example, in the present embodiment, the first operation may be a copy operation, and the second operation may be a paste operation. However, the invention is not limited thereto.

Figure 4:
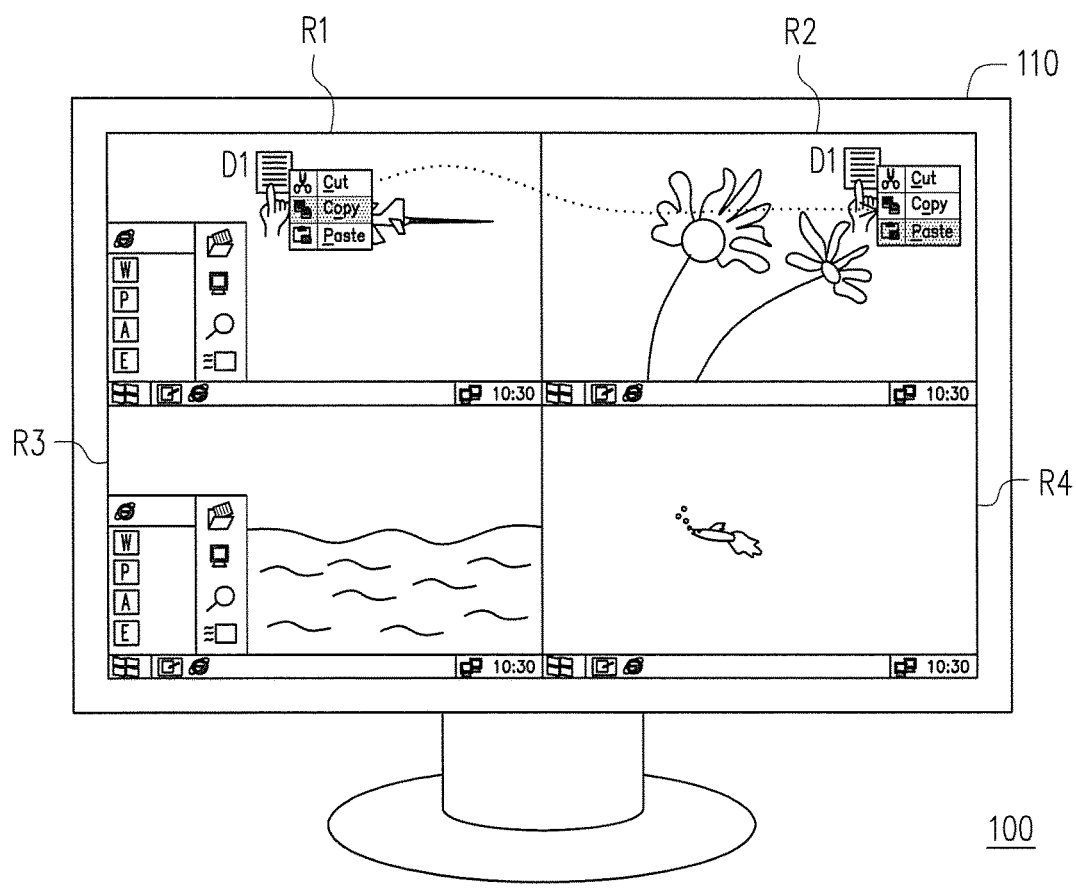
FIG. 4 illustrates a schematic diagram of copy and paste operations according to an embodiment of the invention.

FIG. 4 illustrates a schematic diagram of copy and paste operations according to an embodiment of the invention. As illustrated in FIG. 4, the interactive display 110 of the server apparatus 20 includes displaying regions R1-R4 (i.e., a first displaying region R1, a second displaying region R2, a third displaying region R3, and a fourth displaying region R4) configured to display screen display data of the client apparatuses 30*a*-30*d* respectively. A specific set of a transmission control protocol (TCP) port and a user input back channel (UIBC) port is configured between each of the client apparatuses 30*a*-30*d* and the server apparatus 20 for data transmission. When the user of the server apparatus 20 desires to share a data object D1 from the client apparatus 30*a* to the client apparatus 30*b*, he/she may execute a copy command (i.e., the first operation command) on the data object D1 of the client apparatus 30*a* by tapping the data object D1 displayed in the displaying region R1 and further execute a paste command (i.e., the second operation command) on the client apparatus 30*b* by tapping the displaying region R2.

Figure 5:
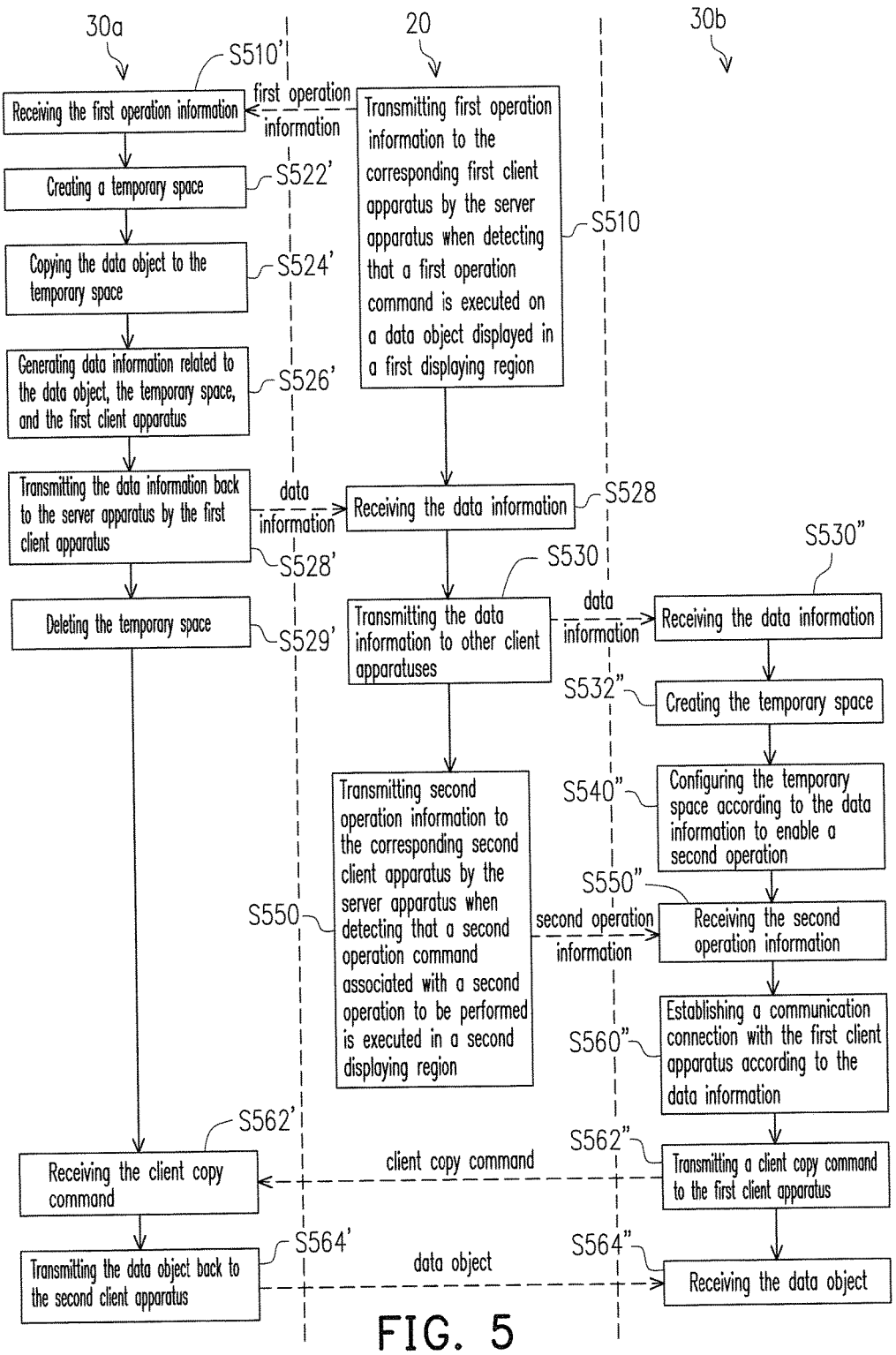
FIG. 5 illustrates a detailed flowchart of a data sharing method according to an embodiment of the invention.

FIG. 5 illustrates a detailed flowchart of a data sharing method according to an embodiment of the invention. Copy and paste operations will be illustrated as to one manner of the data sharing method proposed in the invention. Referring to FIG. 5, after the server apparatus 20 detects that a copy command is executed on the data object D1 displayed in the first displaying region R1, the server apparatus 20 transmits copy operation information (i.e., first operation information) to the corresponding client apparatus 30*a* (Step S510). After the client apparatus 30*a* receives the copy operation information (Step S510'), it performs a copy operation (i.e., a first operation) correspondingly.

To be specific, during the copy operation, the client apparatus 30*a* first creates a temporary space (Step S522'), copies the data object D1 to the temporary space (Step S524'), and generates data information related to the data object D1, the temporary space, and the client apparatus 30*a* according to parameters or settings of the data object D1, the temporary space, and the client apparatus 30*a* (Step S526'). The data information includes a data format and a data string of the data object D1 as well as an IP address of the client apparatus 30*a*. It should be noted that, the aforesaid temporary space in the present embodiment is a clipboard, while a conventional clipboard is a temporary space provided to a plurality of applications for exchanging data. After the data information is generated, the client apparatus 30*a* transmits the data information back to the server apparatus 20 (Step S528') and deletes the temporary space in the client apparatus 30*a* (Step S529').

After the server apparatus 20 receives the data information (Step S528), it transmits the data information to the other client apparatuses 30*b*-30*d* (Step S530). After the client apparatus 30*b* receives the data information (Step S530"), it enables a paste operation (i.e., a second operation) related to the data object. To be specific, the client apparatus 30*b* also creates a temporary space (Step S532") and configures the temporary space according to the data information to enable the paste operation (Step S540"). The temporary space may be a clipboard as previously illustrated. Since the copy and paste operations are considered as continuous operations, the paste operation is normally not executable until the client apparatus 30*b* performs the copy operation. However, the data information includes parameter settings related to the copy operation performed by the client apparatus 30*a*. The client apparatus 30*b* may thus create the temporary space according to the data information to enable the paste operation therein.

After enabling the paste operation, when the server apparatus 20 detects that a paste command associated with the paste operation to be performed by the user is executed on the second displaying region R2, the server apparatus 20 transmits paste operation information (i.e., second operation information) to the client apparatus 30*b* (Step S550). After the client apparatus 30*b* receives the paste operation information (Step S550"), it establishes a communication connection with the client apparatus 30*a* according to the data information so as to obtain the data object D1 directly from the client apparatus 30*a*. To be specific, the client apparatus 30*b* first transmits a client copy command to the client apparatus 30*a* (Step S562"). After the client apparatus 30*a* receives the client copy command (Step S562'), it transmits the data object D1 back to the client apparatus 30*b* (Step S564'). Lastly, the client apparatus 30*b* receives the data object D1 (Step S564").

In the embodiments illustrated above, the data object D1 may be a file or a string. When the data object D1 is a file with any format, the client apparatus 30*b* may store the data object D1 in a designated folder or directory according to the paste command executed on the server apparatus 20 by the user. On the other hand, when the data object D1 is a string, the client apparatus 30*b* may paste the data object D1 on a document application or any input interface according to the paste command executed on the server apparatus 20 by the user.

It should be noted that, the first operation and the second operation are not limited to the copy and paste operations. In an embodiment of the invention, the first operation may be a cut operation, and the second operation may be a paste operation. In such embodiment, after the client apparatus 30*b* (i.e., a second client apparatus) establishes a communication connection with the client apparatus 30*a* (i.e., a first client apparatus) and transmits the data object D1 thereto, the first client apparatus 30*a* may delete the data object D1.

Figure 6:
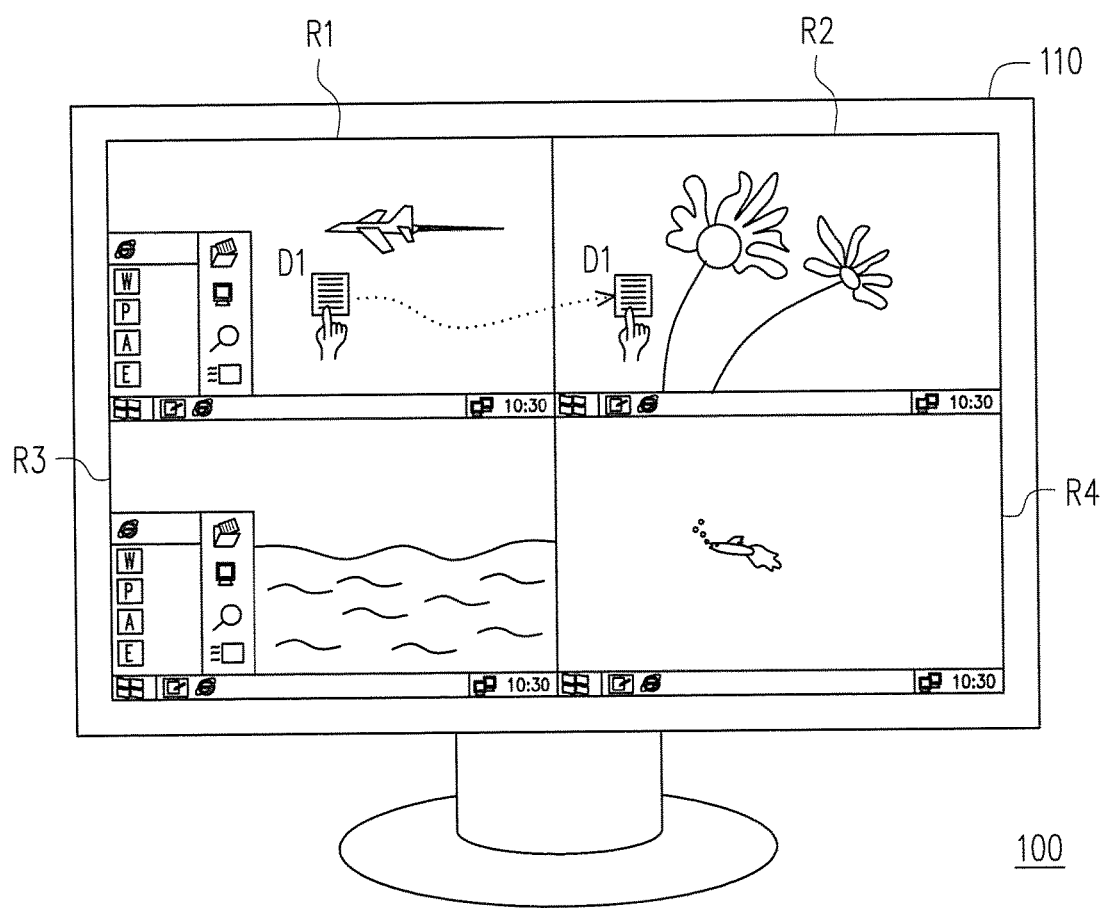
FIG. 6 illustrates a schematic diagram of drag and drop operations according to an embodiment of the invention.

In another embodiment of the invention, the first operation and the second operation may also be drag and drop operations. FIG. 6 illustrates a schematic diagram of drag and drop operations according to an embodiment of the invention. As illustrated in FIG. 6, different from the embodiment in FIG. 4, when the user of the server apparatus 20 desires to share the data object D1 from the client apparatus 30*a* to the client apparatus 30*b*, he/she may drag the data object D1 displayed in the display region R1 to the displaying region R2 (i.e., a drag command) and drop the data object D1 in the displaying region R2 (i.e., a drop command). Based on the embodiments illustrated previously, it will be apparent to the person skilled in the art that the data sharing method proposed in the invention may be adapted to the drag and drop operations by adaptive modification, and thus the detailed implementation will not be further described.

In summary, in the proposed data sharing method and the data sharing system, in response to a first operation command executed on a data object of a first client apparatus by the user, data information related to the data object is obtained and transmitted to other client apparatuses so as to enable a second operation related to the data object in other client apparatuses. Next, in response that a second operation command associated with a second operation to be performed is executed on a second client apparatus by the user, the second client apparatus establishes a communication connection with the first client apparatus and obtains the data object. In such approach, the client apparatuses are allowed to transmit the data object to each other without a third party intermediary. Hence, the time for data transmission would be reduced, and the convenience in usage would be enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data sharing method, adapted to a data sharing system having a server apparatus and a plurality of client apparatuses connected to the server apparatus, wherein the server apparatus comprises an interactive display, and screen display data of the client apparatuses is respectively shared in a plurality of displaying regions of the interactive display, and wherein the data sharing method comprises:
    transmitting first operation information to a first client apparatus by the server apparatus when detecting that a first operation command is executed on a data object displayed in a first displaying region of the displaying regions of the interactive display, wherein the first operation information is associated with a first operation, and wherein the first operation is associated with the first operation command executed on the data object;
    receiving the first operation information to execute a first operation corresponding to the first operation command, generating data information related to the data object, and transmitting the data information to the server apparatus by the first client apparatus, wherein the data information comprises parameters or settings of the data object and an identification of the first client apparatus;
    receiving the data information and transmitting the data information to the plurality of other client apparatuses by the server apparatus;
    receiving the data information by a second client apparatus and enabling, by the second client apparatus, a second operation associated with a second operation command executed on a second displaying: region of the displaying regions of the interactive display:
    transmitting second operation information to the second client apparatus by the server apparatus when detecting that the second operation command is executed on the second displaying region, wherein the second operation information is associated with the second operation;
    receiving the second operation information by the second client apparatus, and establishing a communication connection with the first client apparatus by, the second client apparatus in response to the second operation information to obtain the data object according to the data information; and
    wherein when the first operation is a copy operation, the step of executing the first operation and generating the data information by the first client apparatus comprises:
    creating a temporary space by the first client apparatus;
    copying the data object to the temporary space;
    generating the data information related to the data object, the temporary space, and the first client apparatus, wherein the data information includes a data format and a data string of the data object and an IP address of the first client apparatus; and
    deleting the temporary space by the first client apparatus after the data information is transmitted to the server apparatus.

2. The data sharing method according to claim 1, wherein when the second operation enabled by the second client apparatus is a paste operation, the step of enabling the second operation by the second client apparatus comprises:
    creating another temporary space by the second client apparatus; and
    configuring the another temporary space according to the data information to enable the second operation.

3. The data sharing method according to claim 2, wherein the temporary space is a clipboard.

4. The data sharing method according to claim 2, wherein the step of establishing the communication connection with the first client apparatus by the second client apparatus in response to the second operation information so as to obtain the data object comprises:
    transmitting a client copy command to the first client apparatus by the second client apparatus; and
    receiving the client copy command and transmitting the data object back to the second client apparatus by the first client apparatus.

5. The data sharing method according to claim 1, wherein the data object is a file or a string.

6. A data sharing system comprising:
    a server apparatus, comprising an interactive display; and
    a plurality of client apparatuses, respectively connected to the server apparatus and sharing screen display data in a plurality of displaying regions of the interactive display of the server apparatus, wherein
    the server apparatus transmits first operation information to a first client apparatus when detecting that a first operation command is executed on a data object displayed in a first displaying region of the displaying regions of the interactive display, wherein the first operation information is associated with a first operation, and wherein the first operation is associated with the first operation command executed on the data object,
    the first client apparatus receives the first operation information to execute a first operation corresponding to the first operation command, generates data information related to the data object, and transmits the data information to the server apparatus, wherein the data information comprises parameters or settings of the data object and an identification of the first client apparatus,
    the server apparatus receives the data information and transmits the data information to the plurality of other client apparatuses,
    a second client apparatus receives the data information and enables a second operation associated with a second operation command executed on a second displaying region of the displaying regions of the interactive display;

the server apparatus transmits a second operation information to the second client apparatus when detecting that the second operation command is executed on the second displaying region, wherein the second operation information is associated with the second operation; and the second client apparatus receives the second operation information and establishes a communication connection with the first client apparatus according to the data information in response to the second operation information to obtain the data object according to the data information; and wherein when the first operation is a copy operation, the first client apparatus creates a temporary space therein and copies the data object to the temporary space to generate the data information related to the data object, the temporary space, and the first client apparatus, wherein the first client apparatus deletes the temporary space after the data information is transmitted to the server apparatus, and wherein the data information includes a data format and a data string of the data object and an IP address of the first client apparatus.

7. The data sharing system according to claim 6, wherein when the second operation enabled by the second client apparatus is a paste operation, the second client apparatus creates another temporary space after receiving the data information and configures the another temporary space according to the data information to enable the second operation.

8. The data sharing system according to claim 7, wherein the temporary space is a clipboard.

9. The data sharing system according to claim 7, wherein the second client apparatus establishes the communication connection with the first client apparatus according to the data information and transmits a client copy command to the first client apparatus, and wherein the first client apparatus transmits the data object back to the second client apparatus after receiving the client copy command.

10. The data sharing system according to claim 6, wherein the data object is a file or a string.

11. A data sharing method, adapted to a data sharing system having a server apparatus and a plurality of client apparatuses connected to the server apparatus, wherein the server apparatus comprises an interactive display, and screen display data of the client apparatuses is respectively shared in a plurality of displaying regions of the interactive display, and wherein the data sharing method comprises:

transmitting copy operation information to a first client apparatus by the server apparatus when detecting that a copy operation command is executed on a data object displayed in a first displaying region of the displaying regions of the interactive display, wherein the copy operation information is associated with a copy operation, and wherein the copy operation is associated with the copy operation command executed on the data object;

receiving the copy operation information to execute a copy operation corresponding to the copy operation command, creating a temporary space and copying the data object to the temporary space, generating data information related to the data object based on the temporary space and the first client apparatus, and transmitting the data information to the server apparatus by the first client apparatus, wherein the data information comprises parameters or settings of the data object and an identification of the first client apparatus;

receiving the data information and transmitting the data information to the plurality of other client apparatuses by the server apparatus;

receiving the data information by a second client apparatus and enabling, by the second client apparatus, a paste operation associated with a paste operation command executed on a second displaying region of the displaying regions of the interactive display;

transmitting paste operation information to the second client apparatus by the server apparatus when detecting that the paste operation command is executed on the second displaying region, wherein the paste operation information is associated with the paste operation; and receiving the paste operation information by the second client apparatus, and establishing a communication connection with the first client apparatus by the second client apparatus in response to the paste operation information to obtain the data object by the second client apparatus from the first client apparatus according to the data information, wherein the first client apparatus deletes the temporary space after the data information is transmitted to the server apparatus and wherein the data information includes a data format and a data string of the data object and an IP address of the first client apparatus.

* * * * *